United States Patent
Ogasawara et al.

(10) Patent No.: US 8,072,155 B2
(45) Date of Patent: Dec. 6, 2011

(54) ELECTRODELESS DISCHARGE LAMP DEVICE AND LIGHTING FIXTURE USING THE SAME

(75) Inventors: Hiroshi Ogasawara, Yawata (JP); Ryusuke Ura, Hirakata (JP); Hidenori Kakehashi, Takatsuki (JP); Yoshinobu Shibata, Himeji (JP)

(73) Assignees: Panasonic Electric Works Co., Ltd., Kadoma-shi (JP); Ikeda Electric Co., Ltd., Himeji-shi (JP)

( * ) Notice: Subject to any disclaimer, the term of this patent is extended or adjusted under 35 U.S.C. 154(b) by 503 days.

(21) Appl. No.: 12/226,733

(22) PCT Filed: Mar. 27, 2007

(86) PCT No.: PCT/JP2007/056304
§ 371 (c)(1),
(2), (4) Date: Oct. 27, 2008

(87) PCT Pub. No.: WO2007/125706
PCT Pub. Date: Nov. 8, 2007

(65) Prior Publication Data
US 2009/0134805 A1 May 28, 2009

(30) Foreign Application Priority Data

Apr. 28, 2006 (JP) .................................. 2006-126550

(51) Int. Cl.
*H05B 41/16* (2006.01)
*H05B 41/24* (2006.01)

(52) U.S. Cl. ..................... 315/248; 315/267; 315/285

(58) Field of Classification Search ................... 315/112, 315/248, 267, 285, 344; 313/45–46, 161, 313/485
See application file for complete search history.

(56) References Cited

U.S. PATENT DOCUMENTS

| 3,523,056 A * | 8/1970 | Horning .......................... 442/189 |
| 5,572,083 A | 11/1996 | Antonis et al. |
| 6,175,198 B1 | 1/2001 | Nerone |

FOREIGN PATENT DOCUMENTS

| JP | 6-196006 | 7/1994 |
| JP | 2000-353600 | 12/2000 |
| JP | 2006-108056 | * 4/2006 |
| JP | 2006-331887 A | 12/2006 |

OTHER PUBLICATIONS

International Search Report, Jun. 12, 2007, issued in PCT/JP2007/056304.
Extended European Search Report issued Jul. 2, 2010 in the corresponding European patent application.

* cited by examiner

*Primary Examiner* — Anh Tran
(74) *Attorney, Agent, or Firm* — Edwards Wildman Palmer LLP

(57) ABSTRACT

An electrodeless discharge lamp device comprises an induction coil, a pair of cores 1a, 1b, and thermal conductor 2. The cores 1a, 1b are configured to generate a high-frequency electromagnetic field for exciting a discharge gas with receiving a high frequency electric power. Each of the cores is arranged to give an overall circumference around which the induction coil is wound. The thermal conductor is formed into an approximately cylindrical shape and inserted into the space so as to be thermally coupled with the cores for radiating heat generated at the cores. The core has its inside face at least center portion of which is spaced radially from the thermal conductor by a predetermined distance.

8 Claims, 15 Drawing Sheets

Fig.1B

| The plate-shaped elastic material | Sheet thickness | Noise level (dB) | Temperature of the cores (degree C) |
|---|---|---|---|
| Polyimide tape | 25 μm | 39 | 151 |
| Polyimide tape | 50 μm | 36 | 153 |
| Glass knitted fablic | 0.15 mm | 32 | 157 |
| Glass knitted fablic | 0.3 mm | 29 | 159 |
| Glass knitted fablic | 0.5 mm | 27 | 162 |
| Silicon sheet | 0.8 mm | 25 | 175 |
| Silicon sheet | 1 mm | 26 | 184 |

Fig.2B

| The plate-shaped elastic material | Sheet thickness | Noise level (dB) | Temperature of the cores (degree C) |
|---|---|---|---|
| Glass knitted fablic | 0.3 mm | 26 | 153 |
| Glass knitted fablic | 0.5 mm | 25 | 158 |

ELECTRODELESS DISCHARGE LAMP DEVICE AND LIGHTING FIXTURE USING THE SAME

TECHNICAL FIELD

This invention relates to an electrodeless discharge lamp device which is configured to light an electrodeless discharge lamp filled with a discharge gas excited by the electromagnetic field, and a lighting fixture including the electrodeless discharge lamp device.

BACKGROUND ART

An electrodeless discharge lamp device for lighting an electrodeless discharge lamp having a bulb filled with a discharge gas is long-provided.

The electrodeless discharge lamp device comprises an electric power coupler. The electric power coupler is described as a coupler. The coupler is inserted into a cavity formed to a bulb filled with a discharge gas. FIG. 12 shows the coupler. As shown in FIG. 12, the coupler includes an induction coil (not shown) a pair of semi-cylindrical cores 1a, 1b (FIG. 12 shows the core 1b only), a thermal conductor 2, and a coil bobbin. The induction coil is configured to receive a high frequency electricity and then to generate a high frequency electromagnetic field for exciting the discharge gas. A pair of the cores 1a, 1b is arranged to form approximately cylindrical shape around which the induction coil is wound. The thermal conductor 2 is formed into a cylindrical shape and thermally coupled with the cores 1a, 1b. The thermal conductor 2 is for radiating heat generated at the cores. The coil bobbin is disposed between the cores 1a, 1b and the induction coil to intermediate between the cores 1a, 1b and the induction coil.

The cores 1a, 1b are made of a soft magnetic material having a good high frequency magnetic characteristic. The soft magnetic material is such as Mn—Zn ferrite. The cores 1a, 1b are respectively formed with an opening plane. The cores 1a, 1b are arranged to face each of the opening planes to form approximately cylindrical shape core as a whole.

The thermal conductor 2 is made of a material having a high thermal conductivity. The material having a high thermal conductivity is such as aluminum or copper, or alloy which is made of the aluminum and the copper. The thermal conductor 2 is inserted into a space formed between the cores 1a, 1b. The thermal conductor 2 shown in the FIG. 12 is integrally formed at its lower end with a base which is configured to support the thermal conductor. The base is formed at its circumference of a lower end with a flange 20. The thermal conductor 2 is configured to transfer the heat generated at the cores 1a, 1b to the flange 20 for radiating the heat from the flange 20 to an outside.

The coil bobbin 5 includes a winding body 50 and a pedestal 51. The winding body 50 is formed into a cylindrical shape having a small diameter, and is for covering the core 1 and the thermal conductor 2. The pedestal 51 is formed into a cylindrical shape having a large diameter, and is formed to attach the flange and to surround the base. A part of the winding body 50 which is configured to surround the circumference of the core 1 is formed around its circumference surface with the recess for winding the induction coil around.

The core 1 and the thermal conductor 2 is arranged to cooperatively form a space therebetween. The space is filled with an elastomeric resin such as a silicon rubber 4. The silicon rubber 4 is for adhering the core 1 and the thermal conductor 2, and is for thermally couples the core 1 with the thermal conductor 2. By this means the core 1 is prevented from excessive increasing of temperature of the core 1 by the silicon rubber 4 (for example, see Japanese Patent application no. H6-196006, paragraph [0008] to [0011], to [0020] and FIG. 1).

In addition, the above electrodeless discharge lamp is dimmed by applying a first high frequency electricity and a second high frequency electricity, alternately. The first high frequency electricity is set to have a frequency to light the electrodeless discharge lamp. The second high frequency electricity is set to have a frequency to light out the electrodeless discharge lamp. Furthermore, the first high frequency electricity is applied over a first period. The second high frequency electricity is applied over a second period. The electrodeless discharge lamp is operated by switching the first period and the second period, alternately. In this manner, the electrodeless discharge lamp is commonly dimmed (for example, see Japanese Patent application no. 2000-353600, paragraph [0005], [0014] to [0019] to [0020] and FIG. 1 to 4).

However, in the case that the above electrodeless discharge lamp is controlled by the above dimming control system with using the well known coupler at 50 percent dimming, the coupler generates noise rated at about 45 decibels at a location 20 centimeter away from the bulb. The above noise level generated from the coupler is unacceptable level in common lighting.

In the above dimming control system, voltage waveforms applied to the induction coil shows an abrupt increase in voltage such as surge which is generated at the time of switching the frequency for relighting the bulb. The abrupt increase in voltage causes vibrations of the core 1

In addition, as shown in FIG. 13, the elastomeric resin 4 is held at a space between the core 1 and the thermal conductor 2, thereby being pushed out from the space between the core 1a and core 1b. Therefore, center portions of an inside of the cores 1a, 1b directly come into contact with the thermal conductor 2. That is, the vibration of the core 1 is directly transferred to the thermal conductor 2. As a result, it is considered that the coupler causes an intense noise.

DISCLOSURE OF THE INVENTION

This invention is achieved to provide an electrodeless discharge lamp device which is capable of reducing the noise generated during the operation under the dimming system with periodically switching the frequency, and the lighting fixture using the same.

An electrodeless discharge lamp device having a bulb filled with discharge gas in accordance with the present invention comprises an induction coil, a pair of approximately semi-cylindrical cores, and a thermal conductor. The induction coil is disposed adjacent to the bulb and is configured to generate a high-frequency electromagnetic field for exciting the discharge gas. A pair of the approximately semi-cylindrical cores is arranged to give an overall circumference around which the induction coil is wound. The semi-cylindrical cores is spaced to form a space therebetween. The thermal conductor is formed into an approximately cylindrical shape and inserted into the space so as to be thermally coupled with the cores for radiating heat generated at the cores. The feature of the present invention resides in that the core has its inside face at least a center portion of which is spaced radially from the thermal conductor by a predetermined distance.

In other words, the feature of the present invention resides in that the core have its inside face at least a center portion of which is radially stayed off from the thermal conductor by a predetermined distance.

In this case, the core is not come into contact with the thermal conductor directly. That is, vibration occurred at the core is not transmitted to the thermal conductor because the predetermined distance is formed between the core and the thermal conductor. Therefore, it is possible to obtain the electrodeless discharge lamp device which is configured to reduce the noise generated in operation of the electrodeless discharge lamp device.

It is preferred that a spacer is interposed between each of the cores and the thermal conductor to occupy the distance. The spacer is made of an elastic material. The spacer is shaped into a thin plate.

In this case, the spacer prevents the transmission of the vibration generated at the core to the thermal conductor. Therefore, it is possible to obtain the electrodeless discharge lamp device which is reduced in noise generated by the vibration in operating.

It is preferred that the spacer is formed to have a radial thickness of 0.5 mm or less.

In this case, it is possible to obtain the electrodeless discharge lamp device to prevent an increase in temperature moderately, while reducing in noise generated by the vibration in operating.

It is more preferred that the spacer comprises a tape of a glass knitted fabric with an adhesive layer in at least one surface thereof.

Or, it is preferred that each of the cores is shaped to have its inside face. The inside face comes into contact with the thermal conductor at least two spaced end portion. The two spaced end portions are other than the central portion of the inside face. The central portion is a portion where each core is spaced from the thermal conductor by the distance.

Or, it is preferred that the thermal conductor is shaped to come into contact with at least two spaced end portion other than a central portion of an inside face of the each core. The two spaced end portion is portions where the thermal conductor is spaced from each core by the distance.

In this case, it is possible to reduce number of components of the electrodeless discharge lamp device.

It is preferred that an elastomeric resin is filled in a portion where each of the cores and the thermal conductor is spaced by the distance.

In this case, it is possible to obtain the electrodeless discharge lamp device which is reduced in the noise by the elastomeric resin.

In addition, a lighting fixture of this invention comprises the above mentioned electrodeless discharge lamp device and an electrodeless discharge lamp lighting device. The electrodeless discharge lamp lighting device is for supplying a high-frequency electric power to the induction coil of the electrodeless discharge lamp device.

In this case, it is possible to obtain the lighting fixture which is capable of being reduced in noise in operating with the dimming control system of cyclical switching of the frequency.

BRIEF DESCRIPTION OF THE DRAWINGS

FIG. 1B shows a table of a noise and temperature measurement result of the core in accordance with the electrodeless discharge lamp device of the FIG. 1A, FIG. 2B shows a table of a noise and temperature measurement result of the core in accordance with the electrodeless discharge lamp device of the FIG. 2A.

BEST MODE FOR CARRYING OUT THE INVENTION

Figure 1A:
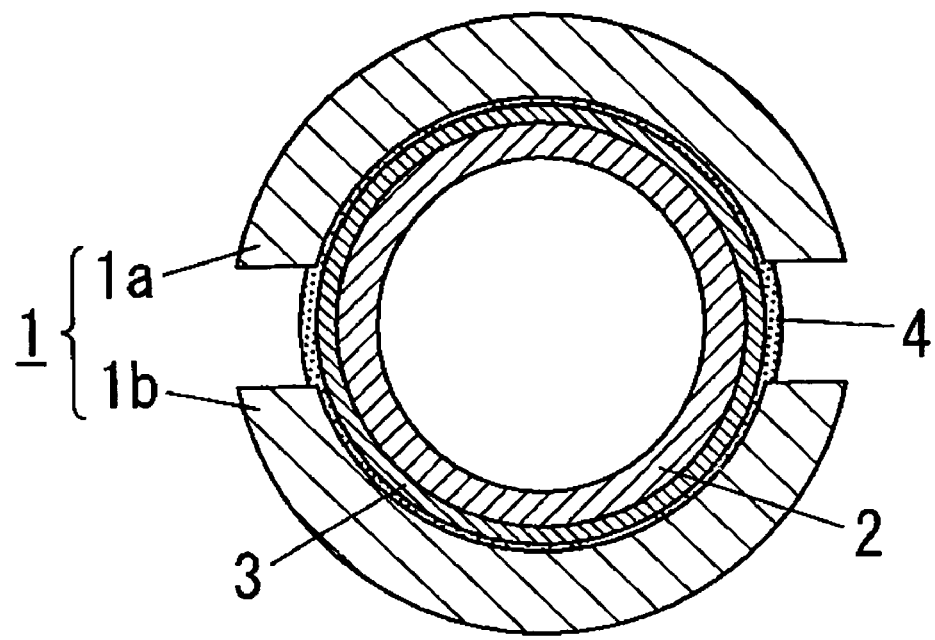
FIG. 1A shows a cross-sectional view perpendicular to the axial direction in accordance with an electrodeless discharge lamp device of a first embodiment of this invention.

Now a reference is made to the attached drawings to explain an electrodeless discharge lamp device in accordance with a first embodiment of the present invention. Basic elements of the electrodeless discharge lamp device in this invention are substantially equal to that of the conventional electrodeless discharge lamp device. Therefore, no duplicate explanation to common parts is deemed necessary. In the drawings, like parts are designed by reference numerals. In addition, in FIG. 1A, an upper direction of the electrodeless discharge lamp device is equal to the upper side of the FIG. 1A. Equally, a left direction, a right direction, and a lower direction of the electrodeless discharge lamp device correspond to a left side, a right side, and a lower side of the FIG. 1A.

Embodiment 1

The electrodeless discharge lamp device of this invention is a power coupler which is configured to be inserted into a recess formed to a surface of a bulb which is filled with a discharge gas. The power coupler is hereinafter called a coupler. The coupler shown in FIG. 1 to 12 includes an induction coil which is not shown, a pair of cores 1a, 1b, a thermal conductor 2, and a coil bobbin 5. The induction coil is disposed adjacent to an electrodeless discharge lamp having a bulb filled with the discharge gas. The induction coil is supplied with a high frequency electric power for generating a high frequency electromagnetic field, thereby exciting the discharge gas. A pair of cores 1a, 1b is approximately formed into semi-cylindrical shape. The cores 1a, 1b are arranged to give an overall circumference. The overall circumference is for winding the induction coil. The semi-cylindrical cores are spaced to form a space therebetween. The thermal conductor is partially inserted into the space to thermally couple with the core 1a, 1b, thereby radiating heat generated at the cores 1a, 1b. The coil bobbin 5 is located between the cores 1a, 1b and the induction coil 5.

The core 1a, 1b is made of a soft magnetic material having a good high frequency magnetic characteristic. The soft magnetic material is, for example, Mn—Zn ferrite. The cores 1a, 1b is arranged to have its inside face facing each other to cooperatively form an approximately cylindrical core 1.

Figure 12:
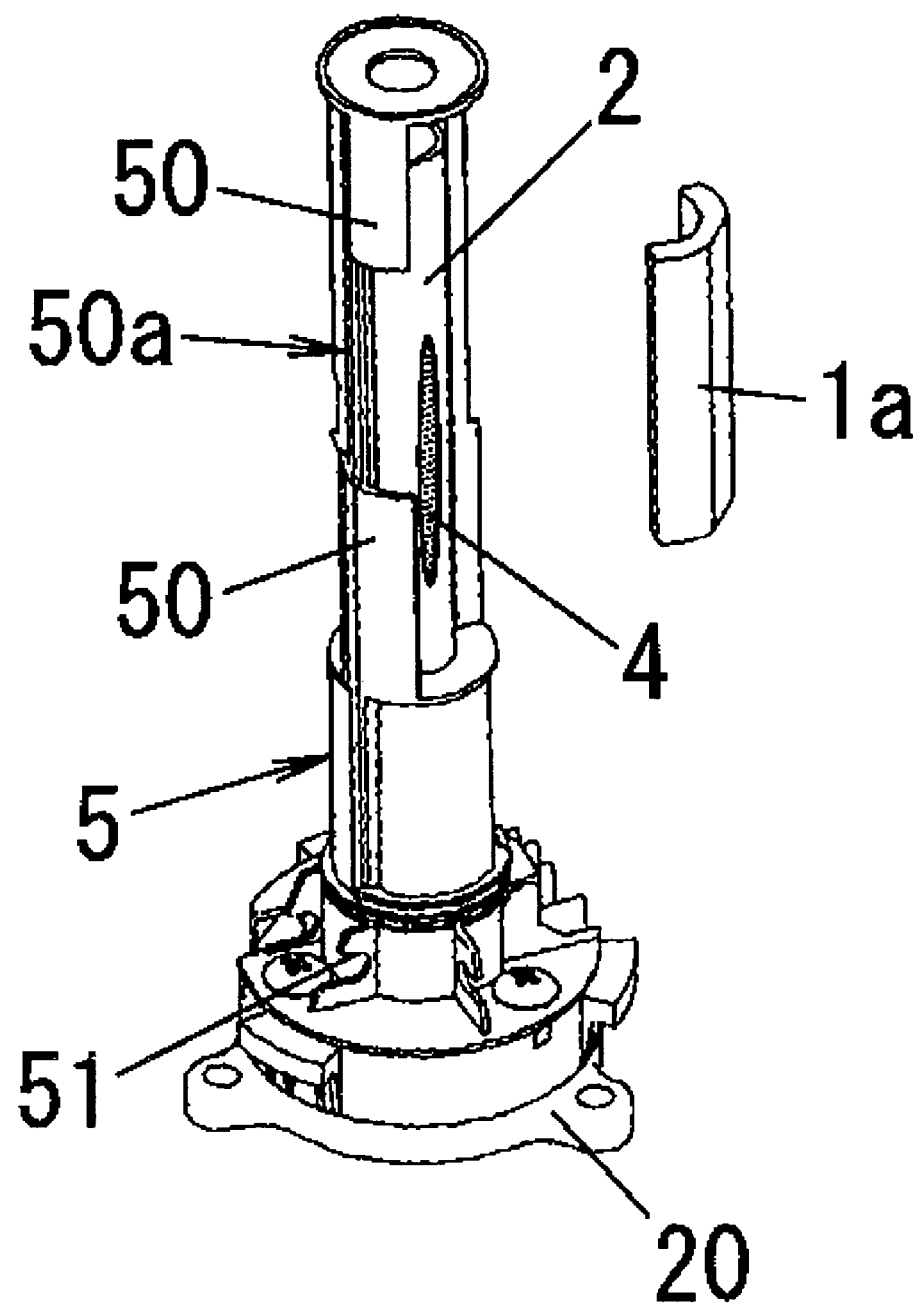
FIG. 12 shows a perspective view of the electrodeless discharge lamp device.
Figure 13:
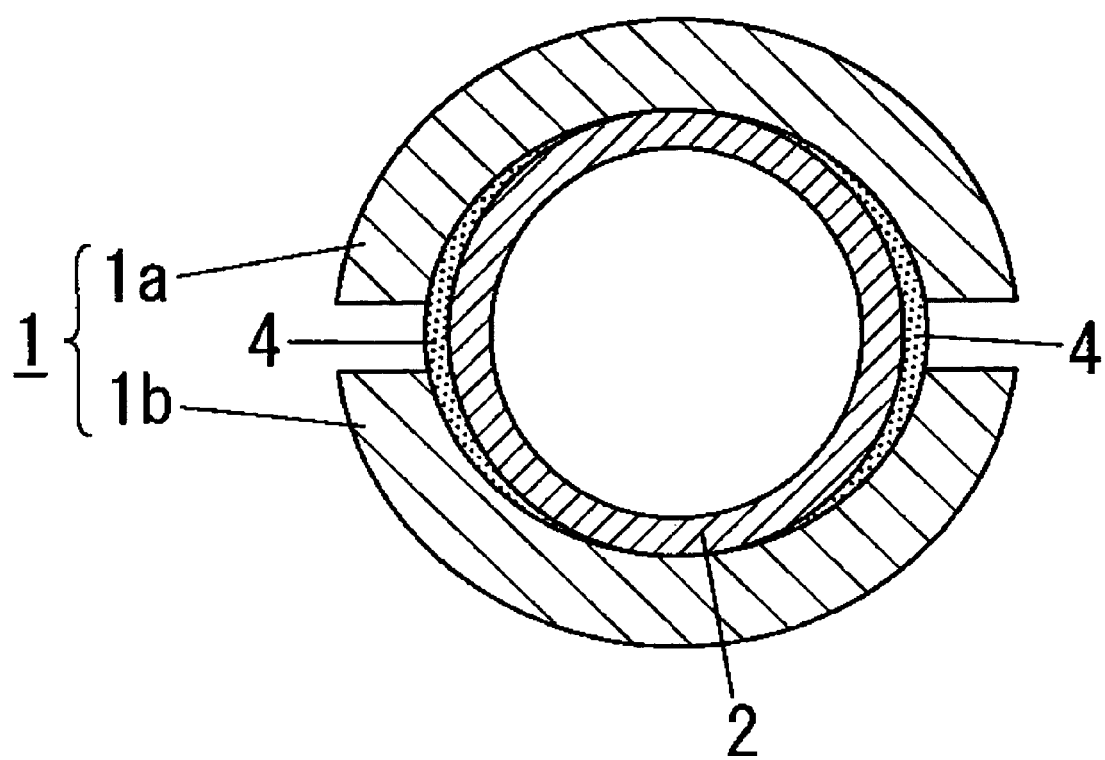
FIG. 13 shows a cross sectional view perpendicular to the axial direction of the electrodeless discharge lamp device in FIG. 12 with the core which comes into contact with the thermal conductor.

The thermal conductor 2 is made of a good thermal conductive material. The good thermal conductive material is, for example, aluminum, copper, and an aluminum-copper alloy. The thermal conductor 2 is inserted into the space between the core 1a and core 1b. As shown in FIG. 12, the thermal conductor 2 is integrally formed at its lower end with a base (not shown). The base is provided for supporting the thermal conductor 2. The base is formed at its circumference of a lower end with a flange 20. The thermal conductor is for radiating the heat of the thermal conductor by way of the flange 20.

The coil bobbin 5 includes a winding body 50 and a pedestal 51. The body 50 is formed into a cylindrical shape with a small diameter to cover the core 1 and the thermal conductor 2, and is wound around its outer circumference surface with the induction coil. The pedestal 51 is formed into a cylindrical shape having a large diameter to touch to the flange 20 and to cover the base. The winding body 50 has a portion which covers the circumference of the core 1. The winding body 50 is formed around its outer circumference with a recess where the induction coil is wound around.

In this embodiment, the core 1a, 1b is formed to have its inside faces which create a predetermined distance in radial direction of the core. The core and the thermal conductor 2 are arranged to cooperatively hold a spacer therebetween to occupy the distance. The spacer 3 is made of an elastic material and is formed into thin plate.

In assembling the coupler, the spacer 3 is wound around an outer circumference of the thermal conductor 2. Subsequently, the elastomeric resin is applied to an outer circumference of the spacer 3 to adhere each of the cores 1a, 1b.

The spacer 3 is incorporated into the coupler, while coming into contact with each of the cores 1a, 1b. The cores 1a, 1b are heated according to the operation of the electrodeless discharge lamp device. Therefore, it is necessary that the spacer 3 is made of material having upper temperature limit of 200 degrees Celsius or more. Therefore, it is preferable to employ the spacer 3 made of a polyimide tape, a glass knitted fabric, and a silicon sheet. The polyimide tape, a glass knitted fabric, and a silicon sheet have the upper temperature limit of 200 degrees Celsius or more. In addition, the glass knitted fabric includes a knitted fabric made of glass fiber and an adhesive layer on one surface or both surface of the glass knitted fabric in a thickness direction. The glass knitted fabric with the adhesive layer is capable of having elasticity.

FIG. 1B shows a measurement result of the noise level of the electrodeless discharge lamp with using the above coupler in operating with dimming control. In addition, the electrodeless discharge lamp is rated at 50 W. And the electrodeless discharge lamp is dimmed to be rated at 25 W. That is, the electrodeless discharge lamp is operated at 50% dimming. The noise level is measured at a distance of 20 cm away from the bulb. In addition, FIG. 1B further shows a measurement result of the temperature of each core 1a, 1b in a rated output. This measurement is performed in an environment that the temperature around the bulb is almost 60 degree C.

The conventional coupler generates noise. Noise level of the conventional coupler in operating is 45 dB. However, the noise level of the electrodeless discharge lamp device with the coupler of this embodiment is several to several dozen lower than the noise level of the conventional coupler. On the other hand, as the spacer 3 gets thicker, the temperature of each of the cores 1a, 1b rises higher. Especially, the silicone sheet having 0.8 to 1.0 mm thickness in radial direction (thickness direction) is not capable of using due to the increase of the temperature of the cores 1a, 1b to 200 to 250 degree C. which is the Curie point of the cores 1a, 1b. Especially, in the case of using the silicone sheet having 0.8 to 1.0 mm thickness in radial direction (thickness direction), the temperature of the cores 1a, 1b rises to the 200 to 250 degree C. The temperature of 200 to 250 is almost Curie point of the cores 1a, 1b. Therefore, the cores 1a, 1b is not capable of operating properly. So, it is preferable that the spacer 3 is formed to have radially thickness of 0.5 mm. In addition, in above measurement condition, the noise level that commonly-used lightings are allowed to generate is approximately 30 dB. Consequently, it is preferable that the spacer 3 is made of knit fabric made of glass fiber with radially thickness of about 0.5 mm.

Figure 2A:
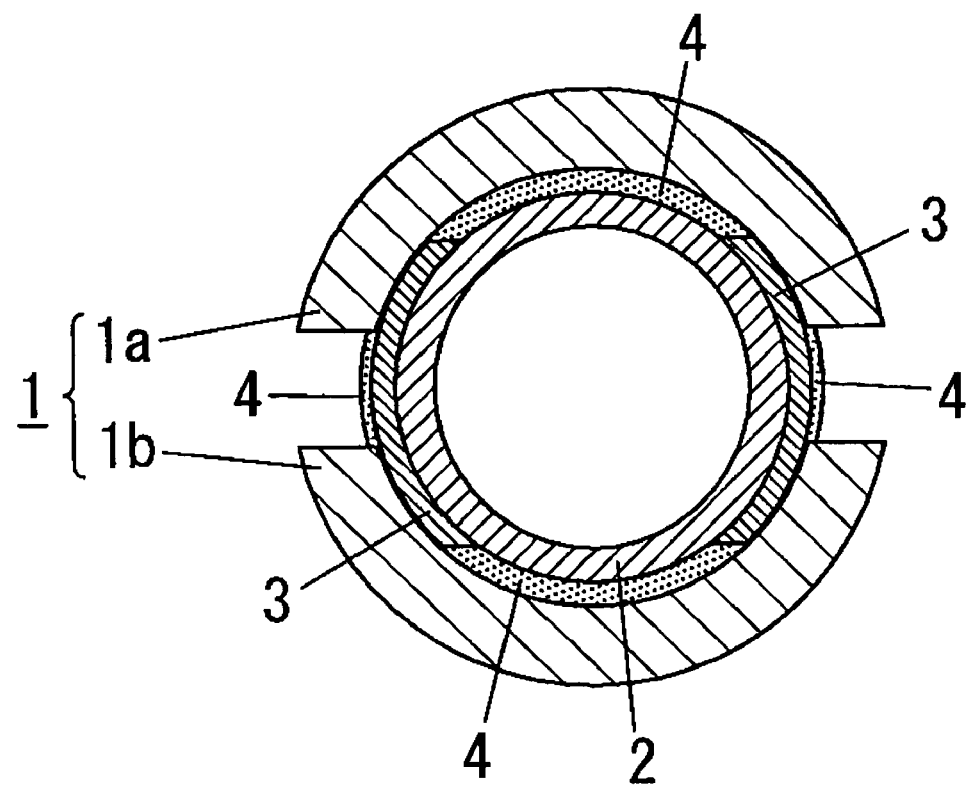
FIG. 2A shows a cross sectional view perpendicular to the axial direction of the electrodeless discharge lamp device with a spacer occupying portions different from FIG. 1A.

Meanwhile, it is preferable to dispose the spacer 3 as shown in FIG. 2A. The spacer 3 is disposed only at a right side and a left side of the thermal conductor 2. Therefore, spaces are formed between the thermal conductor 2 and the center portion of the inside face of the core 1a, 1b. In addition, it is preferable that the elastomeric resin 4 is filled in the distance where each of the cores 1a, 1b and the thermal conductor cooperatively forms.

FIG. 2B shows the measurement result of the noise level in this case. That is, the measurement condition in this embodiment is same as the above-mentioned. Based upon the above measurement result, a measurement is performed to use the coupler with a spacer 3 made of the knitted fabric with glass fiber and having a radially thickness of 0.3 mm and 0.5 mm. As shown in FIG. 2B, the noise level and the temperature of the cores 1a, 1b in using the coupler of FIG. 2A are lower than the noise level and the temperature of the cores in using the coupler 3 having a thermal conductor with the spacer covering overall the outer circumference of the thermal conductor. It is assumed that the elastomeric resin 4 such as silicone rubber has a heat radiating property higher than a heat radiating property of the glass knitted fabric. In addition, the elastomeric resin 4 such as silicone rubber has a vibration deadening property higher than a vibration deadening property of the glass knitted fabric.

According to above, the electrodeless discharge lamp device of this invention comprises the thermal conductor 2 that the thin plated spacer is wounded the predetermined distance is formed between the cores 1a, 1b and the thermal conductor 2. With this configuration, the vibration generated at the cores 1a, 1b is prevented from directly transmitting to the thermal conductor 2. Namely, it is possible to reduce noise generation of the electrodeless discharge lamp device with this configuration. In addition, this configuration is simple and inexpensive.

Figure 11:
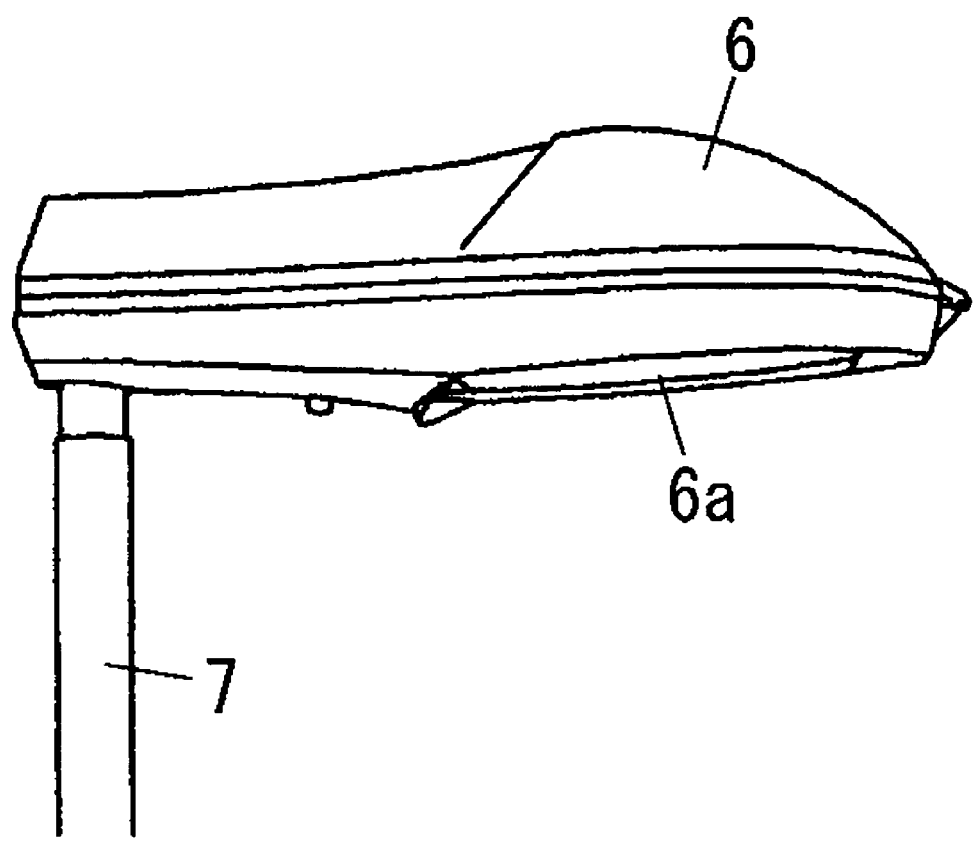
FIG. 11 shows a schematic view of a lighting fixture with employing the electrodeless discharge lamp device.

FIG. 11 shows an example of a lighting fixture with using the above mentioned electrodeless discharge lamp device. This lighting fixture is for lighting a road. The lighting fixture includes a fixture body, and a supporting post. The fixture body houses the above electrodeless discharge lamp device (not shown), an electrodeless discharge lamp (not shown), an electrodeless discharge lamp lighting device (not shown). The electrodeless discharge lamp lighting device is configured to supply the high frequency electric power to the induction coil of the electrodeless discharge lamp device. The supporting post is built at the road to hold the fixture body 6. The fixture body 6 has a lower surface with an opening 6a for light distribution so that the road is illuminated with the light from the electrodeless discharge lamp. In this way, it is possible to obtain the lighting fixture which is configured to reduce the noise generated during the operation in using the above mentioned electrodeless discharge lamp device (coupler).

It is not limited to use the lighting fixture for lighting the road. It is possible to obtain the same effect with using the above coupler in other lighting fixture.

Embodiment 2

Basic elements of an electrodeless discharge lamp lighting device in this embodiment are substantially the same as the electrodeless discharge lamp lighting device in the first embodiment. Therefore, the duplicate explanation to common parts and operations will be omitted. Like parts are designated by reference numerals. Only features are particularly explained in this embodiment.

In this embodiment shown in FIG. 3 to 6, cores 1a, 1b has shape differs from the shape of the cores 1a, 1b in the first embodiment. Therefore, the cores 1a, 1b have its inside face at least a center portion of which is spaced radially from said thermal conductor by a predetermined distance of 0.1 to 0.5 mm without using the spacer 3.

Figure 3:
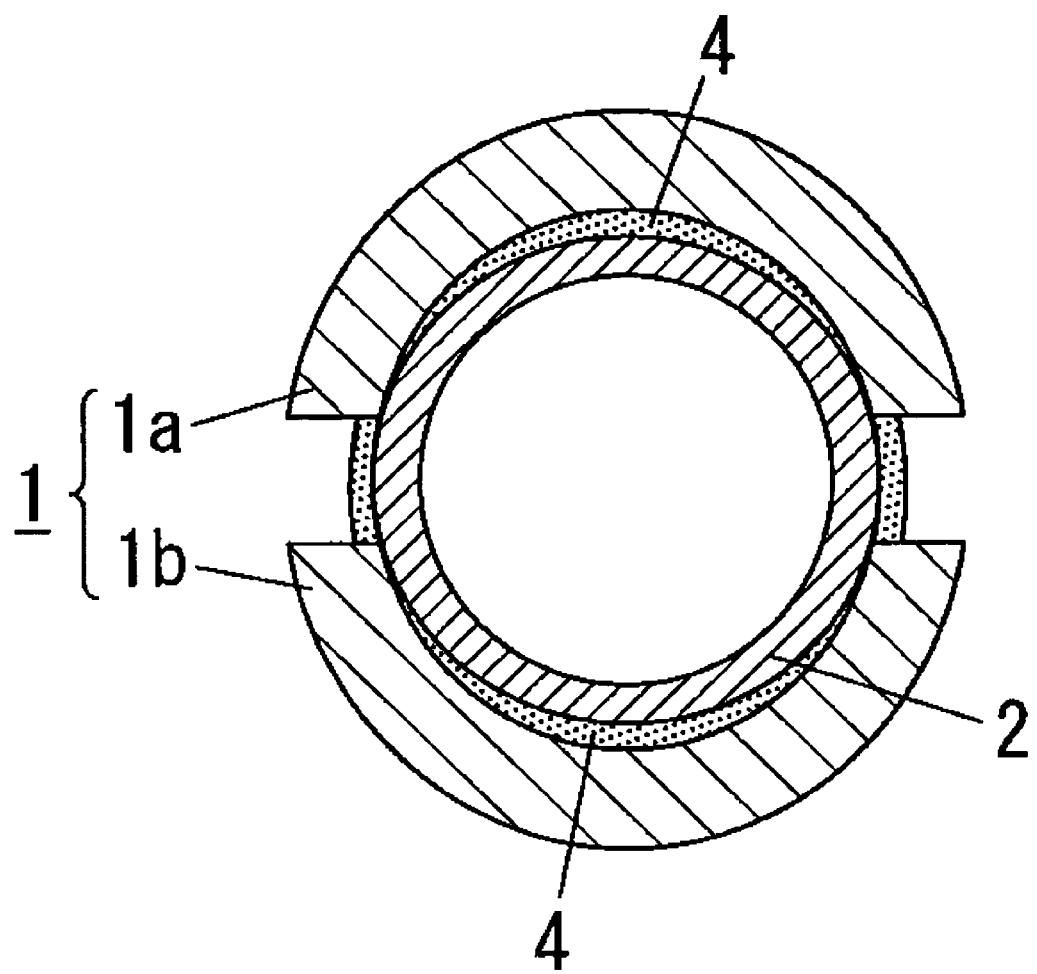
FIG. 3 shows a cross sectional view of the core perpendicular to the axial direction in accordance with the electrodeless discharge lamp device of a second embodiment of this invention.

The cores 1a, 1b in FIG. 3 have curvature of inner circumference differ from curvatures of inner circumference in the first embodiment. The cores 1a, 1b in FIG. 3 have inside diameter shorter than an outer diameter of the thermal conductor 2. Therefore, each of the cores 1a, 1b are shaped to have its inside face which comes into contact with the thermal conductor 2 at two spaced end portions other than the central portion where each core 1a, 1b is spaced from the thermal conductor 2 by the distance. In addition, an elastomeric resin 4 is filled in a portion between each of the cores 1a, 1b and the thermal conductor 2 to occupy the distance.

In this case, right and left ends of the cores 1a, 1b come into contact with the thermal conductor 2 and are held by the thermal conductor 2. Therefore, the elastomeric resin 4 is never pushed out from the portion where the each of the cores 1a, 1b and the thermal conductor 2 is spaced by the distance. With this configuration, the cores 1a, 1b directly comes into contact with the thermal conductor 2. However, a contact area between the cores 1a, 1b and the thermal conductor 2 is smaller than a contact area in conventional coupler. In addition, the elastomeric resin 4 having a vibration deadening property is filled in the space between each of the cores 1a, 1b and the thermal conductor 2. Therefore, it is possible to reduce the noise when the electrodeless discharge lamp device under the operation.

Figure 4:
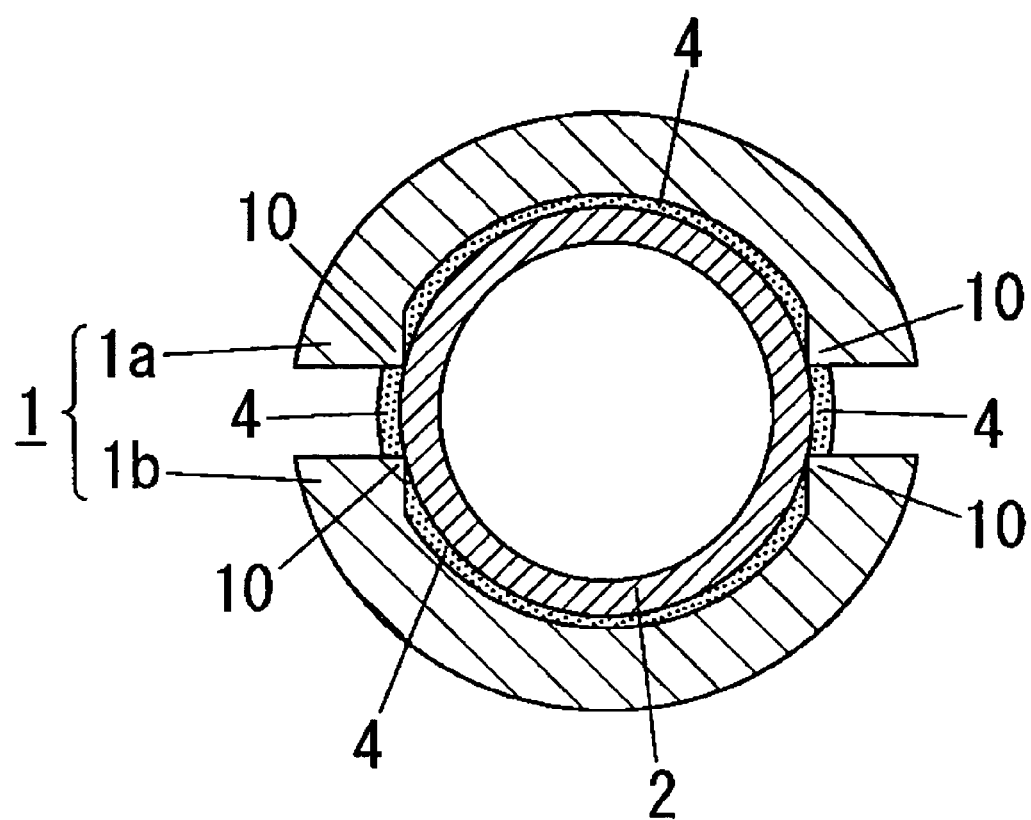
FIG. 4 shows a cross sectional view perpendicular to the axial direction of the core having support parts in accordance with the electrodeless discharge lamp device of the FIG. 3.

Alternatively, it is preferred that each of the cores 1a, 1b is formed at its left and its right ends with support parts which have approximately triangle shape in cross sectional view of radial direction as shown in FIG. 4. In this case, the support parts 10 come into contact with the thermal conductor 2 at the top portion of the support parts 10. With this arrangement, each of the cores 1a, 1b is shaped to have its inside face which comes into contact with the thermal conductor at two spaced portions other than the central portion where each core is spaced from the thermal conductor by the distance. In addition, it is preferred that the elastomeric resin 4 is filled in a portion where each of the cores 1a, 1b and the thermal conductor 2 is spaced by the distance as shown in FIG. 4. With this configuration, it is also possible to reduce the noise generated when the electrodeless discharge lamp lighting device is operated.

Figure 5:
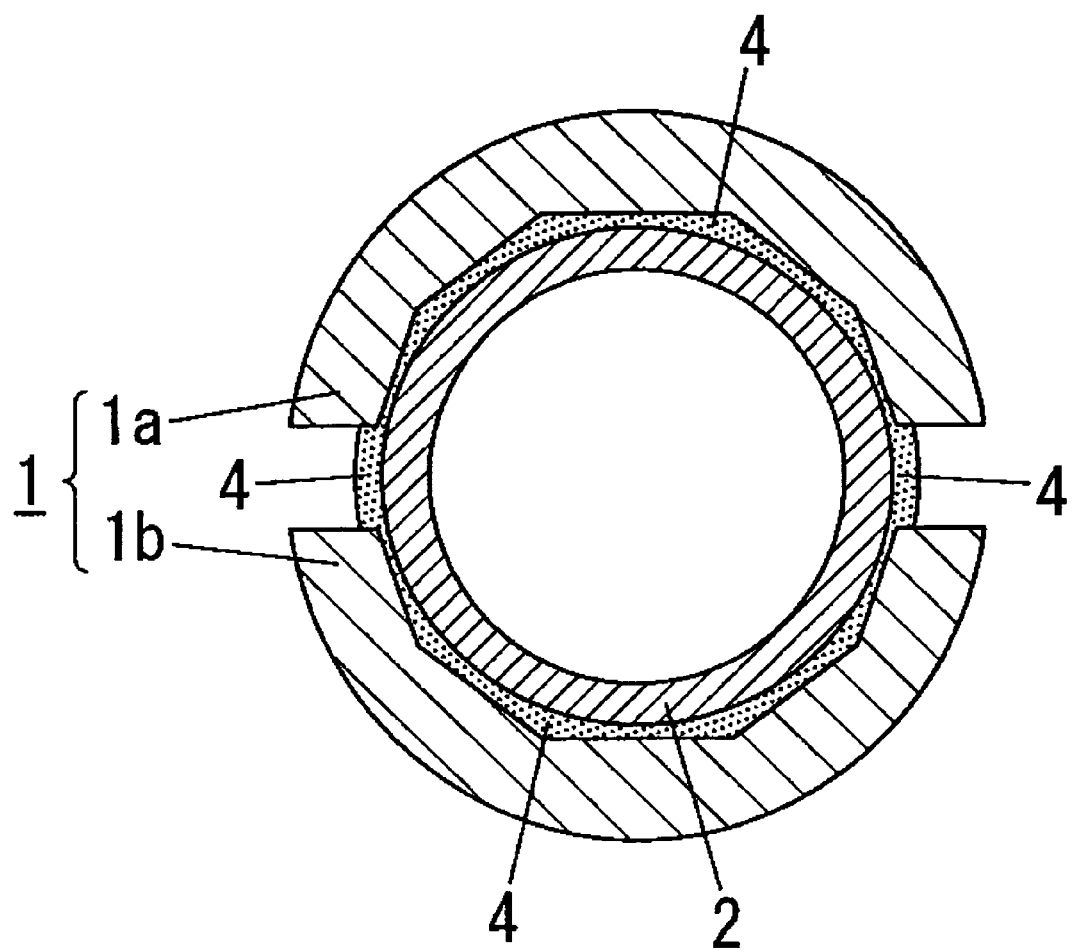
FIG. 5 shows a cross sectional view perpendicular to the axial direction of the core having its inside face formed into adequately polygonal shape in accordance with the electrodeless discharge lamp device of the FIG. 3.

Furthermore, as shown in FIG. 5, it is preferred to employ cores 1a, 1b which is shaped to have polygonal inside surfaces. In this case, the cores 1a, 1b have its inside face which comes into contact with the thermal conductor at two spaced end portions other than the central portion where the each of the cores 1a 1b is spaced from the thermal conductor by the distance. In addition, it is possible to employ the cores 1a, 1b which is shaped to have inside surface coming into contact with the thermal conductor 2 at still more portions such that the a plurality of space is formed between the cores 1a, 1b and the thermal conductor 2. Besides a plurality of the space, it is preferred that the elastomeric resin 4 is filled in the portion where each of the cores and the thermal conductor is spaced by the distance as shown in FIG. 5. With this arrangement, it is also possible to reduce the noise generated under the operation of the electrodeless discharge lamp device.

Figure 6:
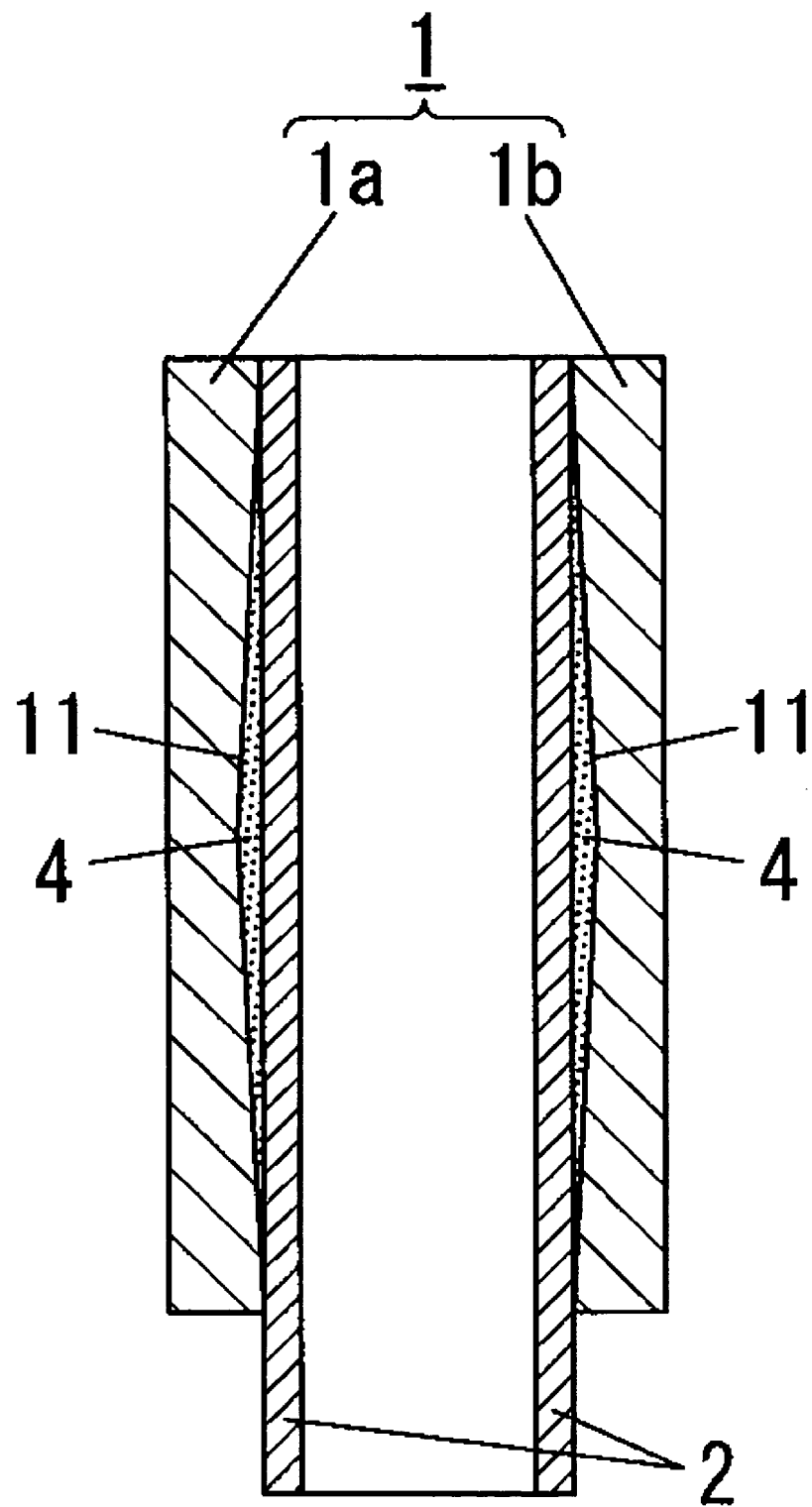
FIG. 6 shows a cross sectional view along the axial direction of the core having its inside face formed with notch in accordance with the electrodeless discharge lamp device of the FIG. 3.

Moreover, it is possible to employ cores 1a, 1b shown in FIG. 6. The cores 1a, 1b in FIG. 6 have a notch formed at the center portion of the inside surface of the cores 1a, 1b. The notch is formed to have triangle shape in cross sectional view along the axial direction. In this case, it is possible to make a space between the cores 1a, 1b and the thermal conductor 2. Furthermore, it is preferred that the elastomeric resin 4 is filled in the space between the cores 1a, 1b and the thermal conductor 2. With this arrangement, it is possible for the electrodeless discharge lamp device to further reduce the noise in operating.

In addition, the lighting fixture with using the electrodeless discharge lamp device in this embodiment is capable of configuring as the lighting fixture in FIG. 11. So it is possible to employ the same elements shown in FIG. 11 except for the electrodeless discharge lamp device in the second embodiment. Therefore, the detail explanation is omitted.

Embodiment 3

Basic elements of an electrodeless discharge lamp device are substantially the same as the electrodeless discharge lamp device in the first embodiment. Therefore, the duplicate explanation to common parts and operations will be omitted. Like parts are designed by reference numerals. Only features are particularly explained in this embodiment.

In this embodiment shown in FIG. 7 to 10, the electrodeless discharge lamp device comprises a thermal conductor which has a shape differ from the thermal conductor of the first embodiment. Therefore, each of the cores has an inside surface with at least approximately central portion in a cross section perpendicular to the axial direction. The approximately central portion is spaced from the thermal conductor 2 by a predetermined distance of 0.1 to 0.5 mm without using the spacer 3.

Figure 7:
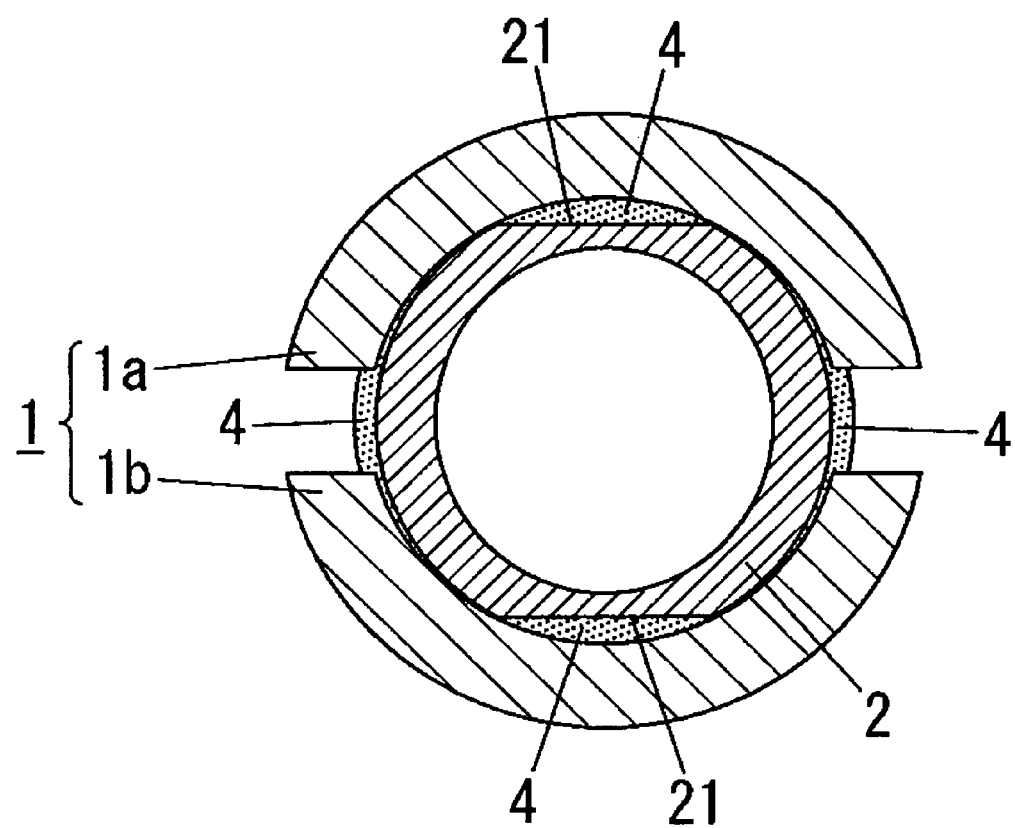
FIG. 7 shows a sectional view in the radial direction of the core in accordance with the electrodeless discharge lamp device of the third embodiment of this invention.

In FIG. 7, both of upper portion and lower portion of the thermal conductor 2 is cut off along the right and left direction. Therefore, the thermal conductor 2 is shaped to come into contact with at least two spaced portions other than a central portion of an inside face of the each core where the thermal conductor is spaced from each core by the distance.

In addition, an elastomeric resin 4 is filled in the space formed between the thermal conductor 2 and the central portion of the inside face of the each core.

In this case, the cores 1a, 1b comes into contact with both of right and left end of flat plane 21 of the thermal conductor 2. Therefore, there is no possibility that the elastomeric resin 4 is pushed out from the space between the cores 1a, 1b and the thermal conductor 2 due to pressure caused by holding the elastomeric resin 4 between the thermal conductor 2 and the cores 1a, 1b. With this configuration, the cores 1a, 1b directly come into contact with the thermal conductor 2. However, a contact area of the thermal conductor 2 and each of the cores 1a, 1 bis smaller than the contact area of the thermal conductor 2 and each of the cores in conventional coupler. In addition, the elastomeric resin 4 having a vibration deadening property is filled in the space between the cores 1a, 1b and the thermal conductor 2. Therefore, it is possible to reduce the noise caused in operating the electrodeless discharge lamp device.

Figure 8:
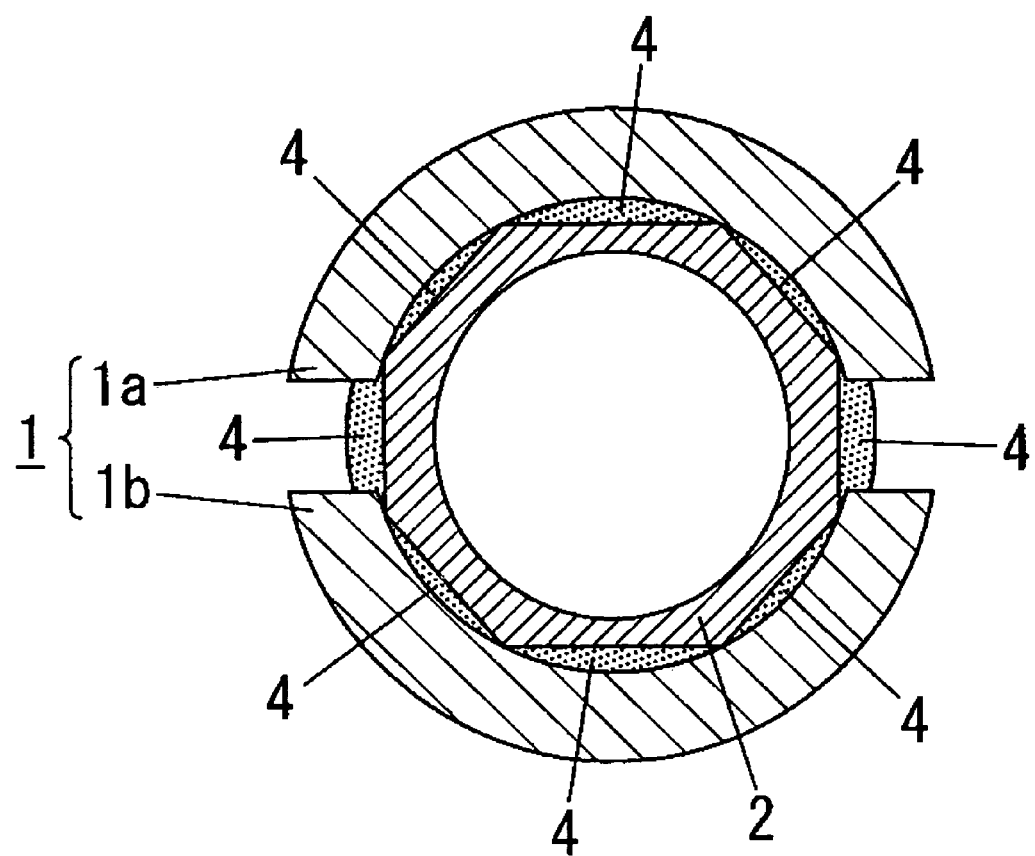
FIG. 8 shows a cross sectional view perpendicular to the axial direction of the core of the electrodeless discharge lamp device in FIG. 7 with thermal conductor being formed to have its exterior face with adequately polygonal shape.

Alternatively as shown in FIG. 8, it is preferred that an outer circumference of the thermal conductor 2 is formed into a polygonal shape. In this case, the thermal conductor 2 is shaped to come into contact with at least two spaced end portions other than a central portion of an inside face of the each core. With this configuration, a plurality of spaces is formed between the cores 1a, 1b and the thermal conductor 2. In addition, it is preferred that the elastomeric resin 4 is filled in the space. In this case, it is also possible to reduce the noise caused during the operation of the electrodeless discharge lamp device as above mentioned.

Figure 9:
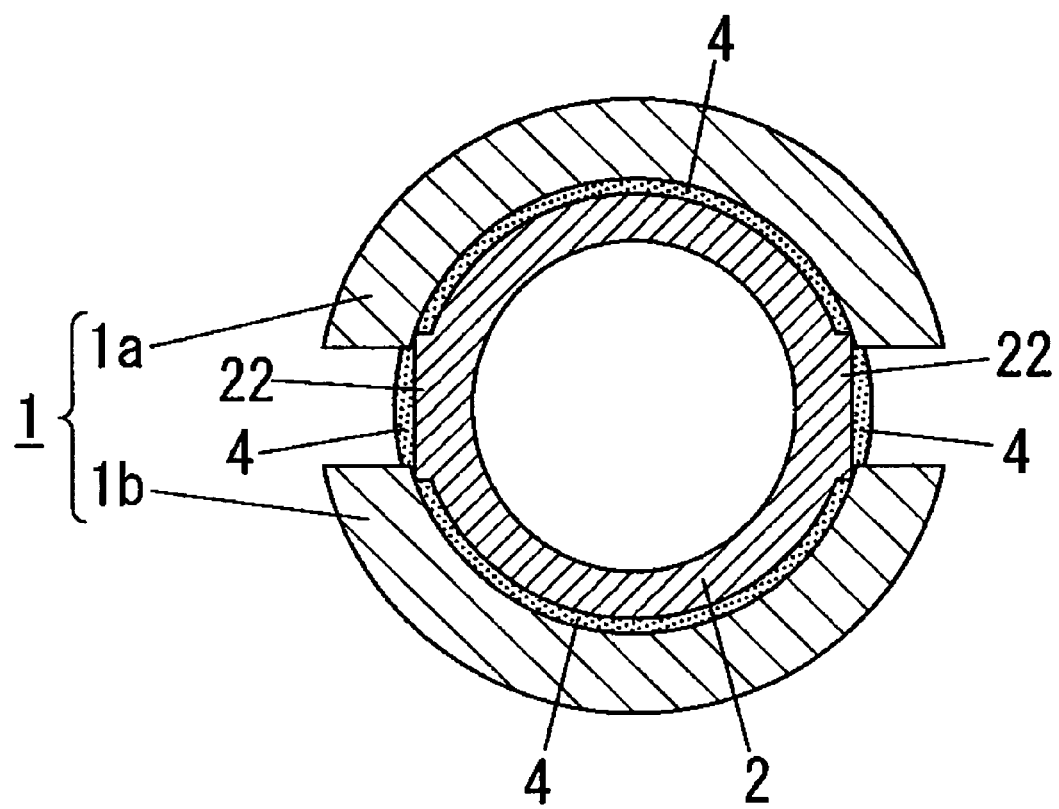
FIG. 9 shows a cross sectional view perpendicular to the axial direction of the core of the electrodeless discharge lamp device in FIG. 7 with thermal conductor being formed with a rib.

Furthermore as shown in FIG. 9, it is preferred that the thermal conductor is formed at its both right and left ends with ribs 22 which are formed to have rectangular shape in the cross section perpendicular to the axial direction. The thermal conductor is disposed to have a top of the rib which comes into contact with at least two portions of the inside of the cores other than the central position. With this configuration, each of the cores 1a, 1b and the thermal conductor 2 are disposed to cooperatively form a space therebetween. In addition, it is preferred that the elastomeric resin is filled in the space between the cores 1a, 1b and the thermal conductor 2. In this case, it is also possible to reduce the noise during the operation of the electrodeless discharge lamp device as above mentioned.

Figure 10:
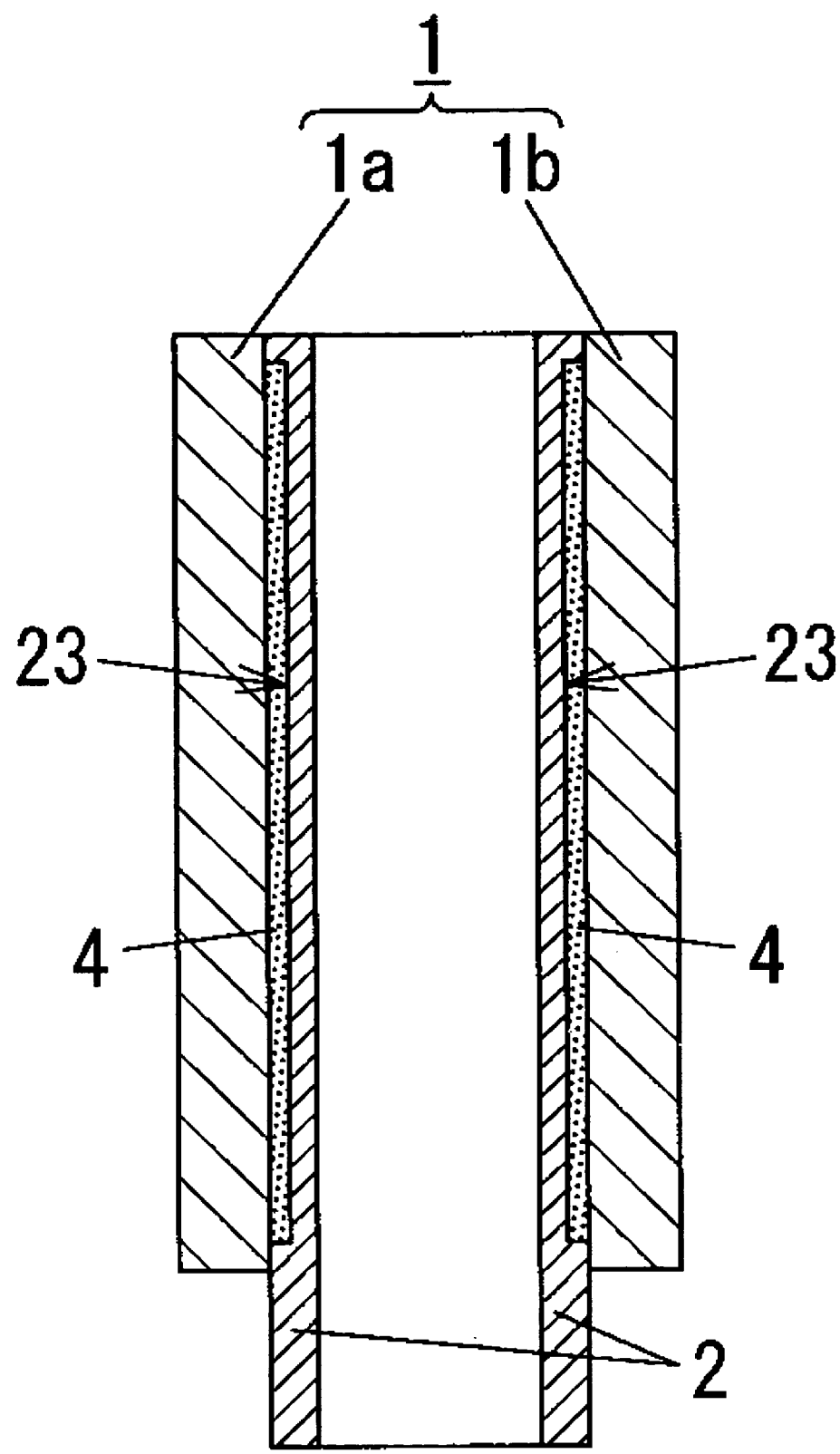
FIG. 10 shows a cross sectional view along the axial direction of the electrodeless discharge lamp device with the thermal conductor formed at its outer circumference surface with a recess.

Moreover as shown in FIG. 10, it is preferred that the thermal conductor is formed to have its outer circumference with a recess 23. The recess 23 is formed along the axial direction with a constant depth. Therefore, the cores 1a, 1b and the thermal conductor 2 are arranged to cooperatively create the space therebetween. In addition, it is preferred that the elastomeric resin 4 is filled in the space. With this configuration, it is possible to further reduce the noise during the operation of the electrodeless discharge lamp device.

In addition, the lighting fixture with using the electrodeless discharge lamp device in this embodiment is capable of configuring as the lighting fixture in FIG. 11. So, it is possible to employ the same elements shown in FIG. 11 except for the electrodeless discharge lamp device. Therefore, the detail explanation is omitted.

As mentioned above, as many apparently widely different embodiments of this invention may be made without departing from the spirit and scope thereof, it is to be understood that the invention is not limited to the specific embodiments thereof except as defined in the appended claims.

The invention claimed is:
1. An electrodeless discharge lamp device having a bulb filled with discharge gas, said electrodeless discharge lamp device comprising:
   an induction coil being disposed adjacent to said bulb and being configured to generate a high-frequency electromagnetic field for exciting said discharge gas;
   a pair of approximately semi-cylindrical cores being arranged to give an overall circumference around which said induction coil is wound, said semi-cylindrical cores being spaced to form a space therebetween; and
   a thermal conductor being formed into an approximately cylindrical shape and inserted into said space so as to be thermally coupled with said cores for radiating heat generated at said cores,
   wherein
   said core having its inside face at least a center portion of which is spaced radially from said thermal conductor by a predetermined distance,
   wherein
   a spacer made of an elastic material and shaped into a thin plate is interposed between each of said cores and said thermal conductor to occupy said distance,
   wherein
   said spacer comprises a tape of a glass knitted fabric with an adhesive layer in at least one surface thereof.

2. An electrodeless discharge lamp device as set forth in claim 1, wherein,
   said spacer is formed to have a radial thickness of 0.5 mm or less.

3. An electrodeless discharge lamp device having a bulb filled with discharge gas, said electrodeless discharge lamp device comprising:
   an induction coil being disposed adjacent to said bulb and being configured to generate a high-frequency electromagnetic field for exciting said discharge gas;
   a pair of approximately semi-cylindrical cores being arranged to give an overall circumference around which said induction coil is wound, said semi-cylindrical cores being spaced to form a space therebetween; and
   a thermal conductor being formed into an approximately cylindrical shape and inserted into said space so as to be thermally coupled with said cores for radiating heat generated at said cores,
   wherein
   said core having its inside face at least a center portion of which is spaced radially from said thermal conductor by a predetermined distance; and,
   wherein each of said cores is shaped to have its inside face which comes into contact with said thermal conductor at least two spaced end portions other than the central portion where each core is spaced from said thermal conductor by said distance.

4. An electrodeless discharge lamp device having a bulb filled with discharge gas, said electrodeless discharge lamp device comprising:
   an induction coil being disposed adjacent to said bulb and being configured to generate a high-frequency electromagnetic field for exciting said discharge gas;
   a pair of approximately semi-cylindrical cores being arranged to give an overall circumference around which said induction coil is wound, said semi-cylindrical cores being spaced to form a space therebetween; and
   a thermal conductor being formed into an approximately cylindrical shape and inserted into said space so as to be thermally coupled with said cores for radiating heat generated at said cores, wherein said core having its inside face at least a center portion of which is spaced radially from said thermal conductor by a predetermined distance; and, wherein said thermal conductor is shaped to come into contact with at least two spaced end portions other than a central portion of an inside face of said each core where said thermal conductor is spaced from each core by said distance.

5. A lighting fixture comprising:

said electrodeless discharge lamp device as defined in claim 1; and an electrodeless discharge lamp lighting device for supplying a high-frequency electric power to said induction coil of said electrodeless discharge lamp device.

6. A lighting fixture comprising:

said electrodeless discharge lamp device as defined in claim 2; and an electrodeless discharge lamp lighting device for supplying a high-frequency electric power to said induction coil of said electrodeless discharge lamp device.

7. A lighting fixture comprising:

said electrodeless discharge lamp device as defined in claim 3; and an electrodeless discharge lamp lighting device for supplying a high-frequency electric power to said induction coil of said electrodeless discharge lamp device.

8. A lighting fixture comprising:

said electrodeless discharge lamp device as defined in claim 4; and an electrodeless discharge lamp lighting device for supplying a high-frequency electric power to said induction coil of said electrodeless discharge lamp device.

* * * * *